Nov. 3, 1959     L. C. SMALL, JR     2,911,267
FAILSAFE BEARING LUBRICATION
Filed Nov. 12, 1957
FIG_1
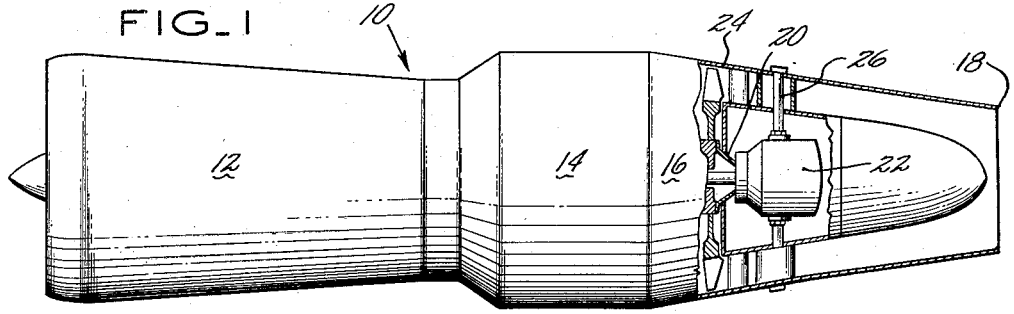
FIG_2
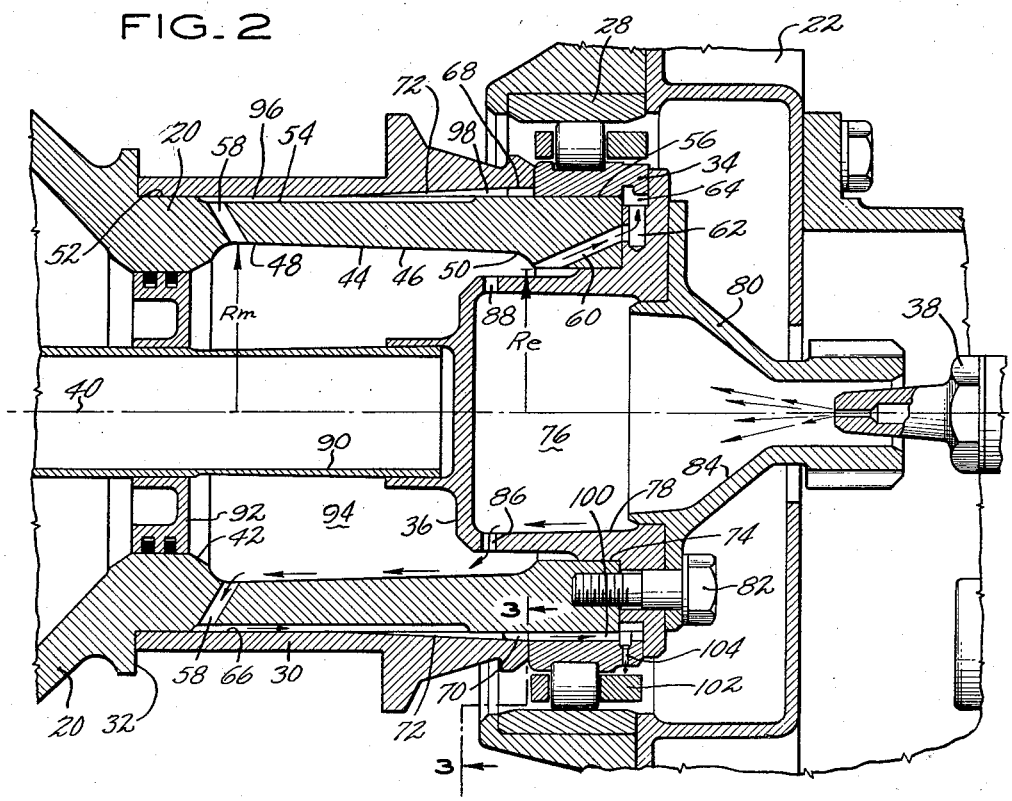
FIG_3
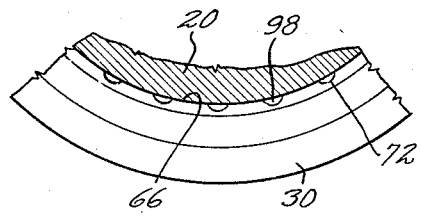
INVENTOR
LESLIE C. SMALL, JR.
BY Vernon F. Hauschild
ATTORNEY

United States Patent Office 2,911,267
Patented Nov. 3, 1959

2,911,267
FAILSAFE BEARING LUBRICATION
Leslie C. Small, Jr., South Glastonbury, Conn., assignor to United Aircraft Corporation, East Hartford, Conn., a corporation of Delaware
Application November 12, 1957, Serial No. 695,567
5 Claims. (Cl. 308—187)

This invention relates to lubricating and cooling means and more particularly to the lubrication and cooling of rotating parts.

It is an object of this invention to teach lubricating and cooling means which utilize the centrifugal force of rotating parts to propel a liquid lubricant and which provides a second lubricant path to the part in need of lubrication which is operative only when the normal lubricant path is not operating properly.

It is a further object of this invention to teach a lubricating and cooling mechanism which utilizes centrifugal force to lubricate and cool rotating parts such as an anti-friction bearing on a rotating shaft, which system utilizes the flow of thin layers of fast moving fluid lubricant across rotating tapered surfaces for part cooling purposes.

Other objects and advantages will be apparent from the specification and claims, and from the accompanying drawings which illustrate an embodiment of the invention.

Fig. 1 is an external showing of a modern turbojet aircraft engine broken away in the turbine rear bearing section to demonstrate an environment of my invention.

Fig. 2 is a fragmentary cross sectional showing to a rear turbine bearing supporting a rear turbine shaft utilizing my lubricating and cooling scheme.

Fig. 3 is a view taken along line 3—3 of Fig. 2.

Referring to Fig. 1, we see modern turbojet aircraft engine 10 of the type fully described in U.S. Patent Nos. 2,700,946 and 2,711,631 which comprises compressor section 12, burner section 14, and turbine section 16 from which the engine gases which have passed therethrough may be discharged to atmosphere either through an exhaust outlet 18 or through an afterburner and exhaust nozzle of the type taught in United States Patent Numbers 2,551,229, 2,702,452 and 2,770,944, but not shown herein. It will be noted that Fig. 1 is broken away in the vicinity of the turbine after bearing. The turbine rear shaft 20 projects into and is supported by the turbine after bearing which is located within bearing housing unit 22 which is supported from engine case 24 by a plurality of radially extending supporting rods 26.

Referring to Fig. 2, we see that turbine rear shaft 20 is supported by rear turbine bearing 28 which is in turn supported by bearing housing or carrier unit 22. Sleeve 30 envelops turbine shaft 20 and extends from shoulder 32 of shaft 20 to the inner race 34 of bearing 28, abutting each. Central housing or cavity forming member 36 is located within shaft 20 and receives fluid lubricant such as oil thru spray nozzle 38. The anti-friction bearing 28, sleeve 30, shaft 20, and member 36 are all preferably of circular cross section and concentric and coaxial about axis 40.

It will be noted that shaft 20 has an inner surface 42 which contains an axially elongated and radially inwardly opening annulus or recess 44 which is tapered slightly, smoothly, and preferably uniformly along axially extending, substantially conical surface 46. The tapered annulus 44 is located within shaft 20 such that its maximum radial dimension $R_m$ from axis 40 occurs at one end 48 thereof while its tapered surface 46 is of minimum or lesser radial dimension $R_e$ at the opposite end 50 thereof, such that the radial dimension of annulus 44 increases in a direction away from bearing 28.

Shaft 20 has an outer surface 52 which contains an axially extending and radially outwardly opening recess or annulus 54 therein, which annulus is preferably of uniform depth and extends substantially the same axial distance along shaft 20 as does annulus 44. Outer surface 52 of shaft 20 also contains constant diameter portion 56 which contacts bearing inner race 34.

A plurality of radially inclined holes 58 project through the wall of shaft 20 to join annulus 44 at its point or location of maximum radial dimension $R_m$ to recess or annulus 54 at its end farthest removed from bearing 28.

Shaft 20 also contains a plurality of radially inclined holes 60 which connect annulus 44 at a location of lesser radial dimension $R_e$ with bearing 28 through conduits 62, bearing annulus chamber 64, and holes 104.

Sleeve 30 has inner surface 66 which is of uniform diameter throughout all of its length except for recess 68 at the end thereof which abuts bearing inner race 34 to form annulus 70 with bearing inner race 34 and shaft outer surface constant diameter portion 56. Sleeve inner surface 66 also contains a plurality of axially extending circumferentially spaced tapered grooves 72 which, as best shown in Fig. 3, communicate with annulus 70 at their point of maximum grooved dimension and decrease in taper gradually and preferably uniformly therefrom until they smoothly blend into sleeve inner surface 66 somewhere along the axial dimension of annulus 54.

Cavity forming member or structure 36 bears against the constant diameter portion 74 of the inner surface 42 of shaft 20 and forms cavity 76 having a tapered inner surface 78 and includes nozzle receiving member 80 such that both are joined to shaft 20 by connecting means 82. Tapered interior 84 of nozzle receiving member 80 of structure 36 complements the tapered interior 78 of member 36 and tapers toward the cavity maximum diameter location 86 where radially directed holes 88 project through the wall of member 36 at a location in substantial radial alignment with the minimum radial dimension location or end 50 of annulus 44.

Shaft 90 and plug 92 coact with shaft 20 and member 36 to form sealed lubricant cavity 94.

Bearing 28, sleeve 30, shaft 20 and members 36, 90 and 92 are caused to rotate, and at varying speeds by the operation of engine 10.

Operation

Fluid lubricant such as oil is directed through spray nozzle 38 from any convenient source such as a lubricant pump (not shown). Upon passing through nozzle 38 the lubricant enters cavity 76 and is hurled outwardly by centrifugal force against the tapered surfaces 84 and 78 of the cavity to be projected as a thin, fast moving film of lubricant across tapered surfaces 84 and 78 toward the cavity maximum diameter location 86 from whence it is centrifuged radially outwardly through holes 88. Upon being centrifuged through holes 88, the lubricant is directed against tapered surface 46 of annulus 44 at its minimum radial dimension end 50 and is propelled by centrifugal force, due to the parts rotation just described, along tapered surface 46 as a fast moving, thin layer of lubricant toward the maximum radial dimension location 48 of annulus 44 where it is centrifuged through the plurality of radially inclined holes 58 into the anti-bearing end of annulus 96 which is formed between the inner surface 66 of sleeve 30 and shaft outer surface annulus 54 and is caused to travel, by the fluid force built up by centrifugal force through annulus 96 in a direction opposite to that which it traveled in passing along annulus 44. The lubricant eventually passes through the reduced area region 98 which is formed between grooves 72 and shaft outer surface constant diameter portion 56 from whence it enters cavity 70. Cavity 70 is provided in the system so that a matching problem will not be encountered in causing grooves 72 of sleeve 30 to communicate with grooves 100, which are either axially or diagonally directed along the inner surface of bearing inner race 34 and which communicate with annulus 70 and with annulus 64. Annulus 64, which is preferably located in the inner surface of bearing inner race 34, communicates with bearing cage 102 through a plurality of radially directed holes 104 which pass through inner race 34 so that the lubricant upon leaving the annulus 70 passes through grooves 100 into annulus 64 and is centrifuged through holes 104 to be projected against bearing cage 102 and hence lubricates bearing 28.

It is a feature of my invention that should this first and above described lubricant path become clogged or otherwise malfunction, the fluid lubricant would begin to fill the lubricant system to a point of flooding or accumulating within annulus 44 of cavity 94. When this occurs, the lubricant depth will eventually be built up, to a point where the lubricant depth exceeds the difference between the annulus 44 maximum radial dimension $R_m$, the point where holes 58 enter annulus 44 and the lesser radial dimension location $R_e$, the point where holes 60 enter annulus 44. When the lubricant in annulus 44 reaches this dimension or depth, it is then propelled by centrifugal force through holes 60 and conduit 62 into annulus 64 from whence it is centrifuged through hole 104 against bearing cage 102 to lubricant bearing 28.

The rate of lubricant flow thru the flow paths firstly and secondly described above may be regulated or governed by varying the size and number of holes such as 58, 60 and 104 and grooves 72 and by varying the speed of engine 10.

It will be noted that cavity 94 is in communication with annulus 64 at all times both through the first lubricant path including holes 58 and the second lubricant path including holes 60 and that centrifugal force causes the lubricant flowing to bearing 28 through the first of the paths, namely, the hole 58 path from returning to cavity 94 through holes 60 by hurling the lubricant outwardly within the annulus 64 and through holes 104 due to a centrifugal force in excess of the normal gravity drain which would return the lubricant through line 60 to cavity 94. The lubricant in annulus 64 and bearing 28 will gravity drain to cavity 94 thru passages 62 and 60.

It is to be understood that the invention is not limited to the specific embodiment herein illustrated and described but may be used in other ways without departure from its spirit as defined by the following claims.

I claim:

1. Bearing lubricating mechanism comprising an elongated member of circular cross section and rotatable about an axis, a bearing engaging the outer surface of said member, said member inner surface having a recessed radially inwardly opening fluid lubricant receiving annulus of substantially conical shape, first conduit means connecting said bearing to said annulus at the annulus maximum radial dimension from said axis so that oil received in said annulus will be centrifuged to said bearing through said first conduit means, and second conduit means connecting said bearing to said annulus at an annulus location of lesser radial dimension from said axis than said first conduit means so that oil will be centrifuged to said bearing through said second conduit means only when the oil depth in said annulus exceeds the difference between said annulus maximum radial dimension and said annulus lesser radial dimension.

2. Bearing lubricating mechanism comprising an elongated member of circular cross section and rotatable about an axis, a bearing engaging the outer surface of said member, said member inner surface having a recessed radially inwardly opening fluid lubricant receiving annulus of substantially conical shape, first conduit means connecting said bearing to said annulus at the annulus maximum radial dimension from said axis so that oil received in said annulus will be centrifuged to said bearing through said first conduit means, and second conduit means connecting said bearing to said annulus at an annulus location of lesser radial dimension from said axis than said first conduit means so that oil will be centrifuged to said bearing through said second conduit means only when the oil depth in said annulus exceeds the difference between said annulus maximum radial dimension and said annulus lesser radial dimension, and means to regulate oil flow through said conduit means.

3. Bearing lubricating mechanism comprising a shaft of circular cross section and rotatable about an axis, a bearing engaging the outer surface of said shaft, said shaft inner surface having an axially elongated recessed annulus with a tapered axially extending surface gradually increasing in radial dimension from one end thereof to the other, a rotatable sleeve member adjacent said bearing and surrounding said shaft and forming passages therewith, first conduit means connecting said bearing to said annulus through said passages at the annulus maximum radial dimension from said axis, second conduit means connecting said bearing to said annulus at an annulus location of lesser radial dimension from said axis than said first conduit means, means to introduce fluid lubricant to the minimum radial dimension end of said annulus axially extending surface, and means to rotate said shaft at varying speeds so that said lubricant passes along said annulus axially extending surface as a thin sheet of fast moving lubricant and is centrifuged to said bearing through said first conduit means and so that lubricant will be centrifuged to said bearing through said second conduit means only when the oil depth in said annulus exceeds the difference between said annulus maximum radial dimension and said annulus lesser radial dimension, and so that lubricant flow varies with variations in the speed of said shaft.

4. Bearing lubricating and cooling means comprising a hollow shaft of circular cross section and having an outer and inner surface and rotatable about an axis, said shaft having an axially elongated recessed annulus in said inner surface which annulus has a tapered axially extending surface which varies uniformly in radial dimension, said shaft further having in said outer surface a constant diameter portion substantially radially aligned with said inner surface annulus minium radial dimension and a recessed portion extending substantially the full length of said shaft inner surface annulus, said shaft further having a first plurality of holes extending from the maximum radial dimension location of said shaft inner surface annulus to said shaft outer surface annulus, at the end of said shaft outer surface annulus opposite said shaft constant diameter portion, an anti-friction bearing having grooves in its inner race inner surface engaging said shaft outer surface constant diameter portion for rotation therewith, stationary bearing support means enveloping said bearing, a sleeve having an inner surface and being of substantially circular cross section and surrounding said shaft outer surface for rotation therewith and abutting said bearing inner race and extending therefrom axially beyond said shaft outer surface recessed portion, said sleeve inner surface being of constant diameter throughout its length except immediately adjacent said bearing inner race where it is recessed to form an annular cavity with said bearing inner race and said shaft outer surface constant diameter portion and having a plurality of axially extending, circumferentially spaced tapering grooves communicating with said annular cavity at the location of maximum groove dimension and tapering to blend smoothly into said sleeve inner surface constant diameter portion at a location along the axial dimension of said shaft outer surface recessed portion, conduit means leading from a location of lesser radial dimension in said shaft inner surface annulus than said first holes location therein, a cavity forming member concentric with said shaft and engaging said shaft inner surface adjacent said annular recess for rotation therewith and defining a cavity which tapers to a location of maximum diameter where a plurality of holes extend through said cavity forming member at a location radially inward of said shaft inner surface annulus lesser radial dimension end, means to introduce fluid lubricant into the lesser radial diameter end of said tapered cavity and means to rotate said shaft, sleeve, bearing inner race and cavity forming member simultaneously so that the fluid lubricant entering said tapered cavity will be carried by centrifugal force as a thin sheet of lubricant toward said maximum diameter tapered cavity location where it is centrifuged through said cavity holes onto said shaft inner surface annulus at its lesser radial dimension end to be carried by centrifugal force as a thin sheet of lubricant along said shaft inner surface in a first direction toward said maximum radial dimension end where the lubricant is centrifugal through said first holes into and through the cavity formed between said sleeve inner surface and said shaft outer surface recessed portion in a direction opposite to said first direction and then through the reduced area region formed by said tapered grooves and said shaft outer surface constant diameter portion and then through said annulus and said bearing inner race groove to be centrifuged against said anti-friction bearing and further so that lubricant will flow to said anti-friction bearing through said conduit means only when the radial dimension of lubricant accumulation in said shaft inner surface annulus exceeds the difference between said shaft inner surface annulus maximum radial dimension location and said conduit means location therein of lesser radial dimension.

5. Bearing lubricating means comprising a hollow shaft of circular cross section and rotatable about an axis and having an annular substantially conical recess in its inner surface, a bearing surrounding and rotatably supporting said shaft and having a lubricant receiving and distributing annulus in its inner surface, a first conduit connecting said bearing annulus to a location of greater radial dimension in said shaft recess, a second conduit entering said bearing annulus from radially inward thereof to and connecting said annulus to a location of lesser radial dimension in said shaft recess, means to rotate said shaft, means to introduce fluid lubricant to said hollow shaft interior recess so that the lubricant will be hurled forceably radially outwardly in said recess by centrifugal force due to shaft rotation from whence it is centrifuged through said first conduit to said annulus and bearing and so that lubricant will be centrifuged through said second conduit to said annulus and bearing only after the height of the lubricant in said recess reaches said lesser radial shaft recess dimension and so that lubricant from said bearing and annulus will be gravity scavenged through said second conduit and into said shaft interior when said rotation ceases.

References Cited in the file of this patent
UNITED STATES PATENTS

| | | |
|---|---|---|
| 2,062,920 | Mapes et al. | Dec. 1, 1936 |
| 2,605,147 | Raichle et al. | July 29, 1952 |
| 2,681,837 | Boyd et al. | June 22, 1954 |

FOREIGN PATENTS

| | | |
|---|---|---|
| 592,947 | Great Britain | Oct. 3, 1947 |
| 1,122,005 | France | May 14, 1956 |